(12) United States Patent
Frank et al.

(10) Patent No.: US 8,844,256 B2
(45) Date of Patent: Sep. 30, 2014

(54) DEVICE FOR TRANSMITTING A FORCE, IN PARTICULAR A CARRYING HANDLE

(75) Inventors: Michael Frank, Uttenreuth (DE); Peter van Haβelt, Erlangen (DE)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/821,305

(22) PCT Filed: Sep. 1, 2011

(86) PCT No.: PCT/EP2011/065098
§ 371 (c)(1),
(2), (4) Date: Mar. 7, 2013

(87) PCT Pub. No.: WO2012/031972
PCT Pub. Date: Mar. 15, 2012

(65) Prior Publication Data
US 2013/0161968 A1 Jun. 27, 2013

(30) Foreign Application Priority Data
Sep. 9, 2010 (DE) .......................... 10 2010 040 495

(51) Int. Cl.
| F16G 13/06 | (2006.01) |
| B66C 1/10 | (2006.01) |
| B66C 1/12 | (2006.01) |
| F16G 15/12 | (2006.01) |

(52) U.S. Cl.
CPC . B66C 1/10 (2013.01); B66C 1/125 (2013.01); F16G 15/12 (2013.01)
USPC ...................................... 59/78; 59/84; 59/93

(58) Field of Classification Search
USPC ........................ 59/78, 35.1, 59, 83, 84, 92, 93
See application file for complete search history.

(56) References Cited

U.S. PATENT DOCUMENTS

| 2,650,470 | A | * | 9/1953 | Sennholtz | 59/90 |
| 3,453,823 | A | * | 7/1969 | Mundt | 59/90 |
| 3,662,539 | A | * | 5/1972 | Florjancic | 59/80 |
| 3,744,239 | A | * | 7/1973 | I'Anson | 59/84 |
| 4,627,232 | A | * | 12/1986 | Bruce | 59/84 |
| 4,715,589 | A | | 12/1987 | Woerndle | |
| 6,871,486 | B2 | * | 3/2005 | Moehnke et al. | 59/78 |
| 7,107,754 | B2 | * | 9/2006 | Sinz et al. | 59/78 |
| 7,231,759 | B2 | * | 6/2007 | Benecke | 59/78 |
| 8,127,523 | B2 | * | 3/2012 | Pengg et al. | 59/78 |
| 8,161,723 | B2 | * | 4/2012 | de Vries | 59/78 |
| 2004/0244354 | A1 | * | 12/2004 | Sinz et al. | 59/90 |
| 2011/0088367 | A1 | * | 4/2011 | Powell et al. | 59/90 |

FOREIGN PATENT DOCUMENTS

| AT | 199014 B | 8/1958 |
| CN | 1522346 A | 8/2004 |
| DE | 1821084 U | 11/1960 |
| DE | 2033140 A1 | 2/1971 |
| DE | 3929148 A1 | 1/1991 |
| DE | 10216461 C1 | 10/2003 |
| DE | 202004014092 U1 | 10/2004 |
| DE | 202011003248 U1 | 4/2011 |
| EP | 0143163 A1 | 6/1985 |
| JP | S5037953 B1 | 7/2008 |
| WO | WO 2009115249 A1 | 9/2009 |

* cited by examiner

*Primary Examiner* — David B Jones

(57) ABSTRACT

A device for transmitting a force, in particular for carrying a load, including two curved arch segments which lie opposite each other and which are connected to each other by two straight limbs that are equally long is provided. The curved arch segments and the straight limbs are produced continuously from one material at the transition points of the arch segments and limbs. A force application and exertion occurs via two bolt-like structural elements which have an outer contour that is adapted to the corresponding curved arch segments and which are to be arranged within the two arch segments in order to transmit the force. The transition of the curvature at the transition points from the limbs to the arch segments and along the respective arch segments is constant.

13 Claims, 2 Drawing Sheets

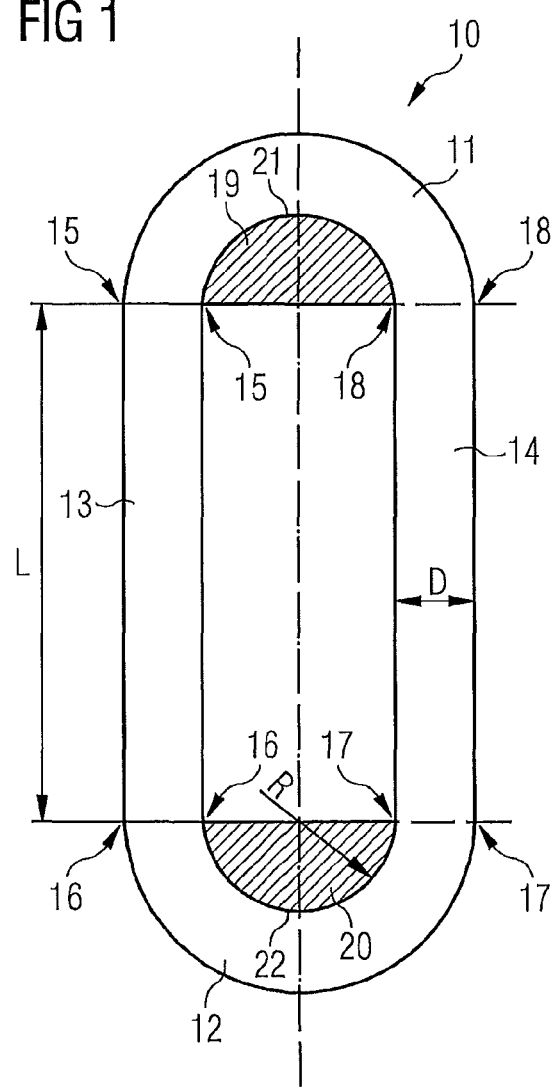

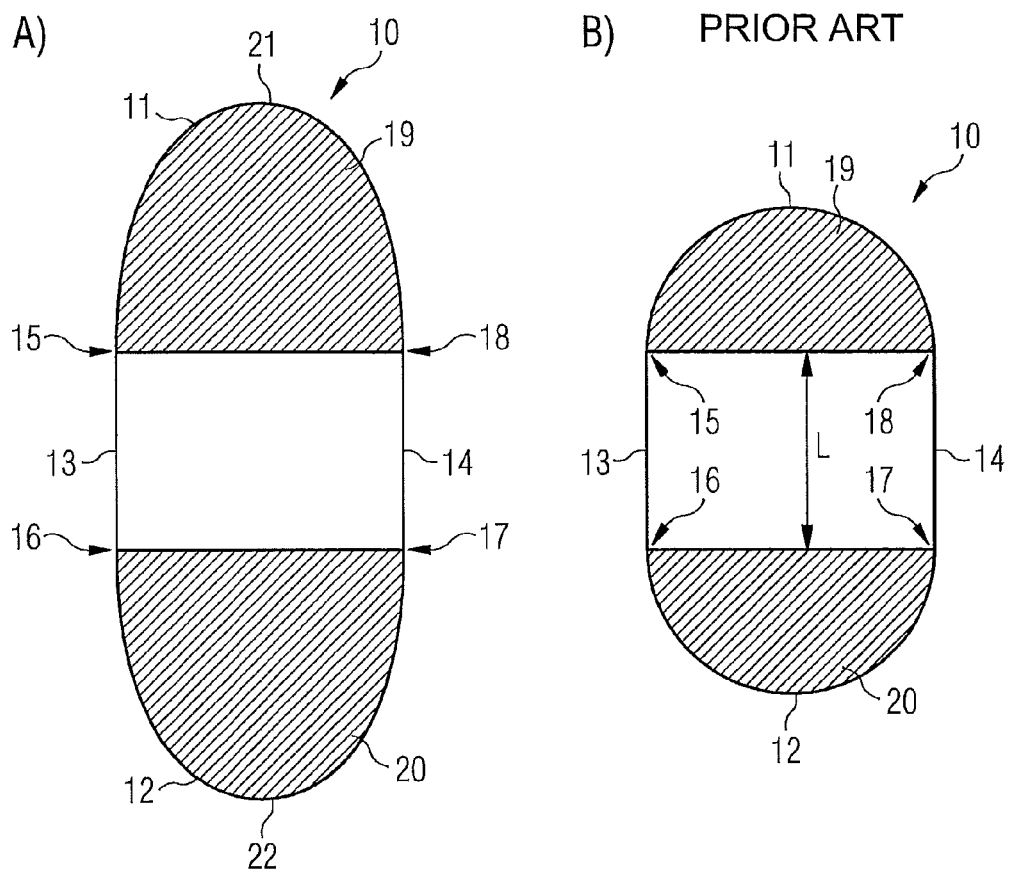

DEVICE FOR TRANSMITTING A FORCE, IN PARTICULAR A CARRYING HANDLE

CROSS REFERENCE TO RELATED APPLICATIONS

This application is the US National Stage of International Application No. PCT/EP2011/065098, filed Sep. 1, 2011 and claims the benefit thereof. The International Application claims the benefits of German application No. 10 2010 040 495.0 DE filed Sep. 9, 2010. All of the applications are incorporated by reference herein in their entirety.

FIELD OF INVENTION

The invention relates to a device for transmitting a force, in particular for carrying a load, comprising two identical curved arch segments which lie opposite each other and which are connected to each other by two straight limbs that are equally long, wherein the curved arch segments and the straight limbs are produced continuously from one material at the transition points, wherein a force application and exertion occurs via two bolt-like structural elements, which have an outer contour that is adapted to the corresponding curved arch segments and which are to be arranged within the two arch segments in order to transmit the force. The invention further relates to a bolt-like structural element for force application and exertion into a device of the type designated above.

BACKGROUND OF INVENTION

Devices for transmitting a force are known, for example, in the form of carrying handles or as chains formed from chain links. A plurality of such devices are used, for example, for carrying large loads. In the following description, reference is made predominantly to loops for the transmitting of a force. This is purely for the simplification of the description and is not to be regarded as restrictive. All embodiments can be transferred in a corresponding manner to chain links.

Carrying handles (simplified as loops) consist as a rule of two semicircular segments, referred to as the loop heads, and straight sections located in between. If the loop is formed from a composite material, such as (Kevlar) fibers impregnated with resin, the dimensionally-stable loops can be formed as one piece, without "seam points". Dimensionally-stable means that the loops exhibit the collective form described heretofore without loading and regardless of their orientation (relative to the ground). The application and exertion of force is effected by means of bolt-like structural elements, which have an outer contour adapted to the semicircular form of the loop heads and are arranged inside the loop heads, such that the structural elements specifically do not come in contact with the straight sections. By means of the structural elements, a radial pressure is introduced into the loop heads. The radial pressure exerted by the structural elements is converted in the loop heads into tensile forces in the direction of the fibers. A force transmission between the two loop heads in the straight regions is effected by a tensile loading in the direction of the fibers of the loop.

The axial tensile force, i.e. the tensile force in the direction of the fibers, and the radial pressure, i.e. the force effect perpendicular to the direction of the fibers, has the effect of a mixed loading in the loop heads. On the one hand, this limits the maximum force which can be transmitted by a loop, which, with loops made of a fiber composite material, is defined by the maximum pressure loadability of the material perpendicular to the direction of the fibers. On the other hand, the mixed loading leads to a substantial magnification of the material stresses in the region of the transition from the loop head to the straight sections. What is referred to as the tension magnification has the known effect of causing the loops to fail in the region of the transition points. The transition points therefore limit the maximum carrying capacity of the loop. This has the effect of an only partial utilization of the strength of the material in the other regions, since, in particular with loops made of fiber composite material, the fibers should be circumferential and, on the other hand, the weakest point determines the necessary geometry and therefore the necessary use of material.

FIG. 1 shows in a diagrammatic representation the structure of a typical known loop, as has been described heretofore. The device 10 formed as a loop for transmitting force comprises two curved arch segments 11, 12 lying opposite each other. The arch segments 11, 12 are connected to each other by two straight limbs 13, 14 of length L, which are equally long. The reference numbers 15, 16, 17, 18 identify the transition points. Depending on the material used for the loops, the arch segments 11, 12 could be connected to the limbs 13, 14 in the region of the transition points by mechanical means, for example by material bonding. If the loop is formed from a fiber composite material, then the curved arch segments 11, 12 and the straight limbs are produced continuously from one material at the transition points 15, 16, 17, 18, i.e. resin-impregnated fibers. The transition points 15, 16, 17, 18 therefore represent regions of the loops relevant only for the adhesion of the arch segments 11, 12 to the straight limbs 13, 14.

The force application and exertion is effected by means of two bolt-like structural elements 19, 20 represented in cross-section. Since the arch segments 11, 12 exhibit the form of a semicircle, the outer contour 21, 22 of the structural elements 19, 20 is likewise formed as semicircular, such that the outer contour 21, 22 comes fully in contact with the arch segments 21, 22. The outer contour 21, 22 of the structural elements 19, 20 is therefore of such a nature that they directly adjoin the transition points 15 and 18 and, respectively, 16 and 17, but specifically do not exhibit any contact with the straight limbs 13, 14. As a result, a defined force application and exertion is guaranteed. Shown in the drawing is only the region of the force application elements which is relevant for the application of the force. The bolts may of course also extend into the region of the straight segments 13 and 14.

The length L of the limbs 13, 14 can in principle be selected at will. Reference character R identifies a radius of the arch segments 11, 12. In the diagrammatic representation, the radius of the two arch segments 11, 12 is identical. In practice, the radii of the arch segments could also be different, wherein the arch segment with the smaller radius then determines the load capacity. The arch segments 11, 12 and the limbs 13, 14 exhibit an identical thickness D over the entire course.

In the case of loops made of a fiber composite material, the mixed loading of axial tensile force and radial pressure are matched inasmuch as the loops are dimensioned according to the force which is required to be transmitted and the permissible tensions, taking into account the points of maximum loadings. This leads to the situation, however, that the loop geometry, i.e. the thickness D of the sections of the loop and the radius R of the arch segments, are subject to severe restrictions. Such a loop geometry may, however, run counter to applications in which loops subject to high loading must be used. This is the case, for example, with the suspension of a superconducting exciter winding of an HTS generator with hot pole core by means of a plurality of loops. Since in this application the loops cause an undesirable conductance of heat, it would in fact be purposeful for the thickness D (generally the cross-section) of the loop sections to be kept as low as possible. In order to be able to configure the tension magnification at the transition points as fail-safe as possible, however, the loop cross-section must be selected as considerably greater than is necessary for transmitting the forces in the straight section. In order to compensate for the increase in heat ingress in the cold part which is caused by this, the length L of the straight limbs of the loop must in turn be increased accordingly. For geometric and electromagnetic reasons, this in turn is in part not possible, and at least not desirable.

SUMMARY OF INVENTION

The object of the present invention is therefore to provide a device for transmitting a force, in particular for carrying a load, with which, in comparison with conventional devices and same cross-sections, a greater force can be transmitted. It is further an object of the present invention to provide a structural element corresponding to this for the transmitting of a force.

These objects are resolved by a device according to the features of the claims, and by a structural element according to the features of the claims. Advantageous embodiments are derived from the dependent claims.

The invention provides a device for transmitting a force, in particular for carrying a load, with two identical curved arch segments which lie opposite each other, which are connected to each other by two straight limbs which are equally long, wherein the curved arch segments and the straight limbs are produced continuously from one material at the transition points, wherein a force application and exertion occurs via two bolt-like structural elements which have an outer contour that is adapted to the corresponding curved arch segments and which are to be arranged within the two arch segments for the transmission of force. According to the invention, the course of the curvature at the transition points from the limbs to the arch segments and along the respective arch segments is continuous.

In other words, this means that the "curvature" of straight limbs and the curvature of the arch segments merge continuously into one another. This arrangement is based on the knowledge that a not inconsiderable part of the tension magnification at the transition between the straight limb and the curved limb through the segment comes about due to the fact that at this point the curvature of the device sections does not run continuously. The curvature jumps from a value 1/R, wherein R is the radius of the arc, in the arch segment, to the curvature 0 in the straight limb. This problem can be avoided by the continuous transition of the curvature between straight limb and arch segment. This allows for the mixed loading of radial pressure and axial tensile force, described in the preamble, to be reduced. As a result, the same force—in comparison with a device from the prior art—can be transmitted with a smaller material cross-section.

It is particularly preferred if the course of the curvature at the transition points of the limbs is continuous and linear.

In particular, it is purposeful if, in addition to this or as an alternative, the course of the curvature along the respective arch segments is continuous and linear.

In a particularly preferred embodiment, the transition of the curvature at the transition points of the limbs to the arch segments is formed by a clothoid. The curvature course of a clothoid can be calculated in a known manner, since clothoids are known from road and rail construction.

In a further embodiment, the device is a loop, in particular made of a fiber composite material. A loop made from fiber composite material exhibits poor heat conduction properties, such that these are particularly well-suited for use in applications in which it is intended that hot and cold elements should be connected to one another, wherein, at the same time, the minimum possible heat exchange should take place. On the other hand, loops made of a fiber composite material exhibit the advantage of a homogeneous material course, in particular in the region of the transition points, such that a high force transmission and stability of the loop is guaranteed.

As an alternative, the device may be a link of a chain, in particular made of a metal. The chain link is also preferably made continuously of one material, wherein this can be produced, for example, by a punch process or an extrusion process.

The invention further provides a bolt-like structural element for force application and exertion into a device of the type described heretofore. The structural element is characterized in that it exhibits an outer contour in the contact region which is adapted to the corresponding curved arch segments, which when used in a device of the type described heretofore, projects at least as far as the transition points. Such a structural element adapted to the device for force transmission ensures that the force can be applied and exerted into the device for force transmission in an optimized manner via the structural elements, without individual regions or points of the device being particularly subject to stress.

In a purposeful embodiment, the curvature of the outer contour is continuous. If the transition of the curvature at the transition points of the limbs is continuous and linear, it is expedient if the curvature of the outer contour (in the region of the transition points) is continuous and linear. In particular, the curvature of the outer contour can be formed by a clothoid, if the corresponding transition of the curvature at the transition points from the limbs to the arch segments is likewise formed by a clothoid.

A plurality of devices and structural elements of the type described heretofore can be used in particular for the suspension of a superconducting exciter winding of a generator with a hot pole core. As well as this, however, the securing system according to the invention is also suitable for the suspension of other objects. In particular, due to the method according to the invention in comparison with the prior art, a smaller installation space is required with the same force transmission.

BRIEF DESCRIPTION OF THE DRAWINGS

The invention is explained in greater detail below on the basis of an exemplary embodiment shown in the drawings, in which FIG. 1 shows a diagrammatic representation as already described of a device designed as a loop for transmitting a force, in accordance with the prior art, and FIGS. 2A and 2B show diagrammatic representations of the curvature course of a loop according to the invention in comparison with a conventional loop in accordance with the prior art.

DETAILED DESCRIPTION OF INVENTION

FIGS. 2A and 2B show in diagrammatic representations the design of a device 10 according to the invention, designed as a loop, for transmitting a force (FIG. 2A), in comparison with the design of a conventional loop (FIG. 2B). The design of the loop shown in FIG. 2B corresponds in this situation to the loop already described in FIG. 1. For better overview, the thickness of the loop in illustration 2 in relation to illustration 2 is reduced to the thickness of a line. Designed in a corresponding manner are identically formed arch segments 11, 12 in semicircular form, lying opposite each other. Ends of the arch segments 11, 12 lying opposite each other are connected to straight limbs 13, 14 of length L. The transition points, i.e. those points at which the curvature does not run continuously and runs from a value 1/R in the arch segment 11, 12 to 0 in the limbs 13, 14, are designated by the reference numbers 15, 16, 17, 18. R in this situation represents the radius of a respective arch segment 11, 12.

FIG. 2A shows the design of a loop according to the invention. To allow for a simple comparison, the straight limbs 13, 14 connecting the arch segments 11, 12 with each other exhibit the same length L as those of the loop according to FIG. 2B. The arch segments 11, 12 lying opposite each other are arranged in the manner of a clothoid, and exhibit a continuous and linear transition of the curvature at the transition points from the limbs 13, 14 to the arch segments and also in their further course. This means that the curvature which amounts to 0 at the transition points 15, 16, 17, 18 in the straight limbs passes in a continuous and linear fashion into the curvature of the respective arch segments 11, 12.

As an alternative to the clothoid curve shown in the exemplary embodiment, any other curve form is also suitable which allows for a continuous transition from the straight limbs to the arch segments 11, 12.

By means of the proposed method, the tension magnification at the transition points 15, 16, 17, 18 can be reduced. The cross-section of the loop according to the invention can therefore be reduced by comparison with the conventional loop in FIG. 2B.

In order for the prescribed force to be able to be reliably transmitted, it is necessary for structural elements 19, 20, which provide for force application and exertion into the loop, also to be adapted to the curvature course of the arch segments 11, 12. For this reason, the structural elements 19, 20 of the device 10 according to the invention exhibit an outer contour 21, 22 adapted to the curvature of the arch segments 11, 12. In the present exemplary embodiment, the outer contour of the structural elements 19, 20 is therefore also clothoid-shaped.

The design of the structural elements 19, 20 is such that they are in total contact with the arch segments 11, 12, but do not exhibit any contact with the straight limbs 13, 14. In other words, this means that the structural elements 19, 20 exhibit the last contact in the region of the transition points 15, 16, 17, 18 with the loop. This is not absolutely necessary, however. The structural elements could likewise also exhibit contact with the limbs 13, 14.

In principle, the length L of a loop according to the invention can be selected as desired. For example, in an extreme embodiment it would even be possible for the length L to amount to 0. However, if it is intended that the loop according to the invention is to be used for carrying a load, with which the opposing structural elements are in contact with hot and cold surroundings, then a heat transfer can be reduced by the provision of a specific limb length L. The exact dimension of the length L can be determined by calculation or by experiments.

The radius of the opposing arch segments 11, 12 in the embodiment described is identical only by way of example (but is also preferred). In practice, the radii of the arch segments may also be different, wherein the arch segment with the smaller radius would then determine the load carrying capacity.

The arrangement of the loop according to the invention is based on the recognition that the tension magnification at the transition points 15, 16, 17, 18 is correlated with the degree of inconstancy of the curvature transition. By way of a continuous design of this transition, the load-bearing capacity of non-optimized loops can be substantially increased. With optimized loops, a corresponding reduction of the wall thickness is possible.

As material for the loop it is expedient if a fiber composite material is used. The principle is known in this situation for individual fibers to be embedded in a resin. This results, even in the region of the critical transition points, in a continuous embodiment of the loop, without joint points.

The invention claimed is:

1. A device for transmitting a force, comprising:
 two curved arch segments which lie opposite each other and which are connected to each other by two straight limbs that are equally long,
 wherein the curved arch segments and the straight limbs are produced continuously from one material at a plurality of transition points,
 wherein a force application and exertion occurs via two bolt-like structural elements, which have an outer contour that is adapted to the corresponding curved arch segments and which are to be arranged within the two arch segments in order to transmit the force, and
 wherein the course of the curvature at the plurality of transition points from the limbs to the arch segments and along the respective arch segments is continuous.

2. The device as claimed in claim 1, wherein the course of the curvature at the plurality of transition points from the limbs to the arch segments and along the respective arch segments is continuous and linear.

3. The device as claimed in claim 1, wherein the course of the curvature at the plurality of transition points from the limbs to the arch segments or along the respective arch segments is continuous and linear.

4. The device as claimed in claim 1, wherein the transition of the curvature at the plurality of transition points from the limbs to the arch segments is formed by a clothoid.

5. The device as claimed in claim 1, wherein the device is formed by a loop.

6. The device as claimed in claim 5, wherein the loop is made of a fiber composite material.

7. The device as claimed in claim 1, wherein the device is a chain link.

8. The device as claimed in claim 7, wherein the device is made of metal.

9. The device as claimed in claim 1, wherein a first radius and a second radius of the opposite arch segments are identical.

10. A bolt-like structural element for force application and exertion in the device as claimed in claim 1, wherein the structural element exhibits an outer contour which is adapted to the corresponding curved arch segments in a contact region, which, when used in the device, projects at least as far as to the plurality of transition points.

11. The structural element as claimed in claim 10, wherein a curvature of the outer contour is continuous.

12. The structural element as claimed in claim 11, wherein the curvature of the outer contour is continuous and linear.

13. The structural element as claimed in claim 11, wherein the curvature of the outer contour is formed by a clothoid.

* * * * *